US012578866B2

(12) United States Patent
Chen

(10) Patent No.: US 12,578,866 B2
(45) Date of Patent: Mar. 17, 2026

(54) DATA PROCESSING METHOD FOR IMPROVING CONTINUITY OF DATA CORRESPONDING TO CONTINUOUS LOGICAL ADDRESSES AS WELL AS AVOIDING EXCESSIVELY CONSUMING SERVICE LIFE OF MEMORY BLOCKS AND THE ASSOCIATED DATA STORAGE DEVICE

(71) Applicant: Silicon Motion, Inc., Hsinchu County (TW)

(72) Inventor: Yu-Ta Chen, Keelung City (TW)

(73) Assignee: Silicon Motion, Inc., Hsinchu County (TW)

( * ) Notice: Subject to any disclaimer, the term of this patent is extended or adjusted under 35 U.S.C. 154(b) by 45 days.

(21) Appl. No.: 18/142,590

(22) Filed: May 3, 2023

(65) Prior Publication Data

US 2024/0103732 A1     Mar. 28, 2024

(30) Foreign Application Priority Data

Sep. 26, 2022    (TW) .................................. 111136327

(51) Int. Cl.
*G06F 3/06* (2006.01)
(52) U.S. Cl.
CPC .......... *G06F 3/0613* (2013.01); *G06F 3/0646* (2013.01); *G06F 3/0653* (2013.01); *G06F 3/0679* (2013.01)
(58) Field of Classification Search
None
See application file for complete search history.

(56) References Cited

U.S. PATENT DOCUMENTS

| | | | |
|---|---|---|---|
| 8,799,601 B1* | 8/2014 | Chen ..................... | G06F 3/0608 |
| | | | 711/163 |
| 9,811,288 B1* | 11/2017 | Chen ..................... | G06F 3/0679 |

(Continued)

FOREIGN PATENT DOCUMENTS

| | | |
|---|---|---|
| CN | 111984604 A | 11/2020 |
| TW | 201308074 A1 | 2/2013 |

(Continued)

*Primary Examiner* — Jared I Rutz
*Assistant Examiner* — Alexander J Yoon
(74) *Attorney, Agent, or Firm* — Winston Hsu

(57) ABSTRACT

A data storage device includes a memory device and a memory controller. The memory controller maintains a write count for each sub-region of the memory device. When the memory controller has selected one or more sub-regions to perform a data rearrangement procedure, the memory controller further determines whether a selected sub-region is a hot-write sub-region according to the write count corresponding to the selected sub-region. When the memory controller determines that the selected sub-region is not a hot-write sub-region, the memory controller performs the data rearrangement procedure on the selected sub-region to move data corresponding to logical addresses belonging to the selected sub-region to a memory space of the memory device having continuous physical addresses. When the memory controller determines that the selected sub-region is a hot-write sub-region, the memory controller does not perform the data rearrangement procedure on the selected sub-region.

15 Claims, 8 Drawing Sheets

(56)        References Cited

U.S. PATENT DOCUMENTS

2014/0013027  A1*    1/2014    Jannyavula Venkata ....................
                                                G06F 12/0866
                                                711/E12.024
2016/0371195  A1*   12/2016    Kim ........................ G06F 3/061
2018/0267720  A1*    9/2018    Goldberg .............. G06F 3/0679
2021/0019650  A1*    1/2021    Hsu ........................ G06F 3/064
2021/0042239  A1*    2/2021    Ioannou .............. G06F 12/1018
2021/0133095  A1*    5/2021    Kim ........................ G11C 8/04

FOREIGN PATENT DOCUMENTS

TW          201310234  A1      3/2013
TW          I597605  B        9/2017
TW          201917581  A       5/2019
TW          I756854  B        3/2022

* cited by examiner

FIG. 3

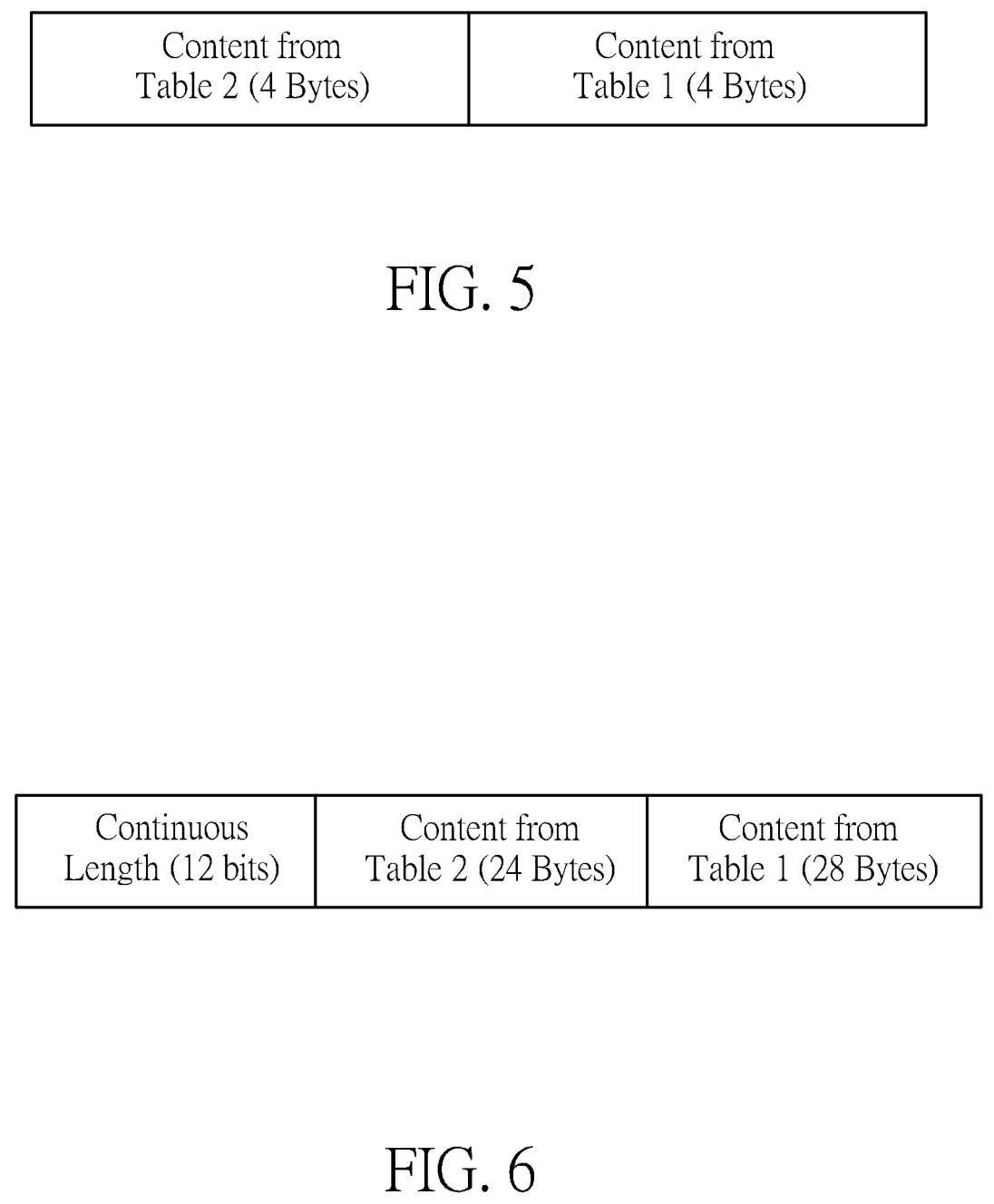

| Content from Table 2 (4 Bytes) | Content from Table 1 (4 Bytes) |
|---|---|

FIG. 5

| Continuous Length (12 bits) | Content from Table 2 (24 Bytes) | Content from Table 1 (28 Bytes) |
|---|---|---|

Maintaining a write count for each Sub-Region

S804

Determining whether to exclude a Sub-Region from one or more selected Sub-Regions according to the write count associated with the Sub-Region Start

S902

Selecting one or more sub-regions to perform a data rearrangement procedure based on a predetermined rule

S904

Determining whether to exclude a Sub-Region from the one or more selected Sub-Regions based on whether the Sub-Region is a system data Sub-Region End

DATA PROCESSING METHOD FOR IMPROVING CONTINUITY OF DATA CORRESPONDING TO CONTINUOUS LOGICAL ADDRESSES AS WELL AS AVOIDING EXCESSIVELY CONSUMING SERVICE LIFE OF MEMORY BLOCKS AND THE ASSOCIATED DATA STORAGE DEVICE

BACKGROUND OF THE INVENTION

1. Field of the Invention

The invention relates to a data processing method to improve efficiency of data processing and efficiency of read operations of a memory controller by performing data rearrangement as well as avoiding excessively consuming service life of memory blocks by excluding a portion of sub-regions from performing the data rearrangement.

2. Description of the Prior Art

With the rapid growth of data storage technology in recent years, many data storage devices—such as memory cards manufactured in compliance with the Secure Digital (SD)/ Multi Media Card (MMC) standards, Compact Flash (CF) standards, Memory Stick (MS) standards or Extreme Digital (XD) standards, as well as solid state hard drives, Embedded Multi Media Cards (eMMC) and Universal Flash Storage (UFS)—have been used widely for a variety of purposes. Therefore, how to achieve efficient access control via data rearrangement while avoiding excessively consuming service life of memory blocks of these data storage device is an important issue.

SUMMARY OF THE INVENTION

According to an embodiment of the invention, a data storage device comprises a memory device and a memory controller. The memory device comprises a plurality of memory blocks. The memory blocks correspond to a plurality of logical units. Each logical unit corresponds to a plurality of logical addresses. The logical addresses corresponding to each logical unit are divided into a plurality of regions and each region is further divided into a plurality of sub-regions. The memory controller is coupled to the memory device and configured to access the memory device. The memory controller is configured to maintain a write count for each sub-region. When the memory controller has selected one or more sub-regions to perform a data rearrangement procedure, the memory controller is configured to further determine whether a selected sub-region is a hot-write sub-region according to the write count associated with the selected sub-region. When the memory controller determines that the selected sub-region is not a hot-write sub-region, the memory controller is configured to perform the data rearrangement procedure on the selected sub-region to move data corresponding to logical addresses belonging to the selected sub-region to a memory space of the memory device having continuous physical addresses, and when the memory controller determines that the selected sub-region is a hot-write sub-region, the memory controller is configured not to perform the data rearrangement procedure on the selected sub-region.

According to an embodiment of the invention, a data processing method for a data storage device comprising a memory device and a memory controller, wherein the memory device comprises a plurality of memory blocks, the memory blocks correspond to a plurality of logical units, each logical unit corresponds to a plurality of logical addresses, the logical addresses corresponding to each logical unit are divided into a plurality of regions and each region is further divided into a plurality of sub-regions, the memory controller is coupled to the memory device and configured to access the memory device, and the data processing method is performed by the memory controller and comprises: maintaining a write count for each sub-region; and determining whether to exclude a sub-region from one or more selected sub-regions according to the write count associated with the sub-region, wherein the one or more selected sub-regions are selected to perform a data rearrangement procedure, and when the sub-region is determined as a hot-write sub-region according to the write count associated with the sub-region, the sub-region is excluded from the one or more selected sub-regions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a schematic diagram showing operations under the Host control mode.

FIG. 5 is a schematic diagram showing an exemplary format for an HPB entry.

FIG. 6 is a schematic diagram showing another exemplary format for an HPB entry.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
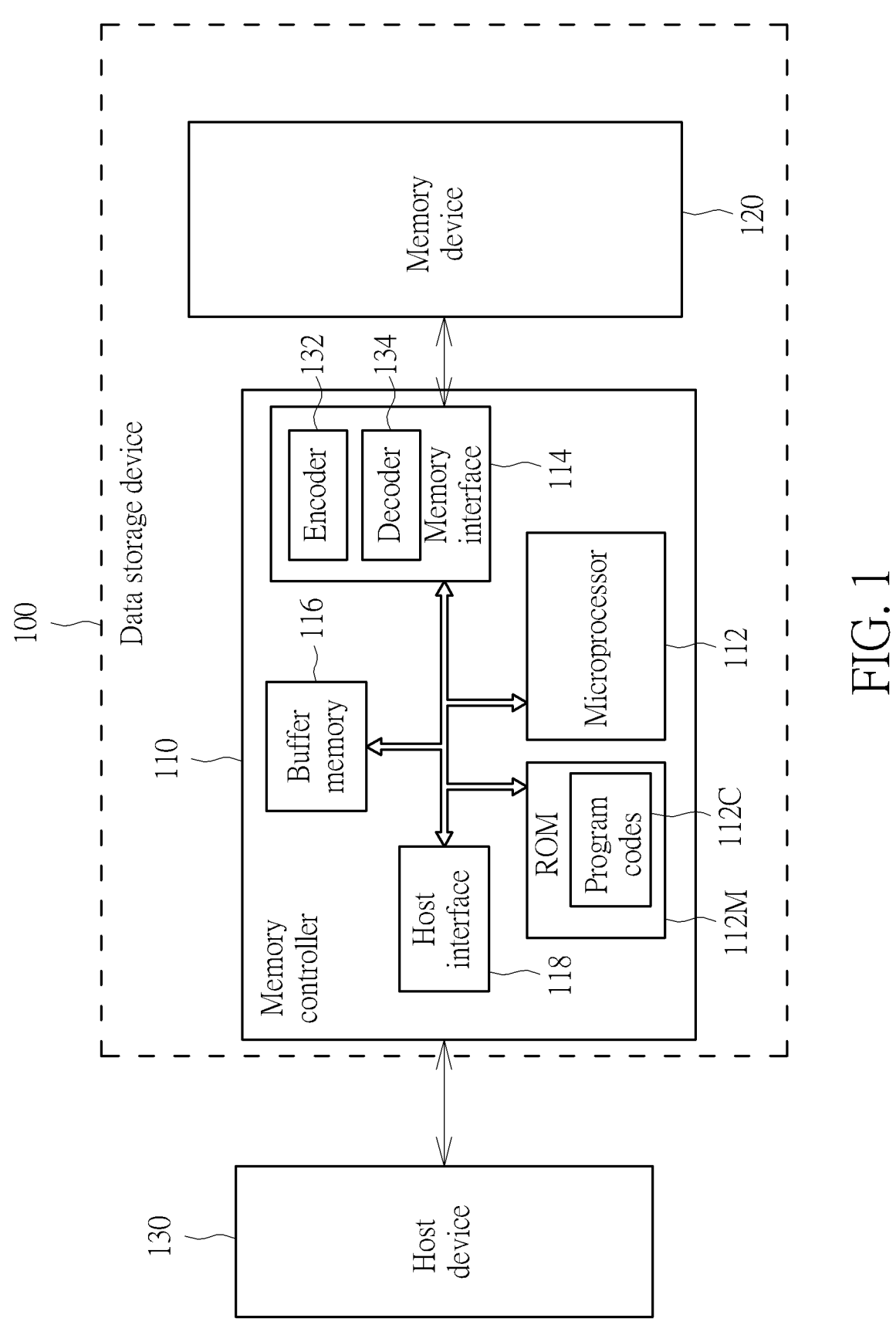
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks, the Triple-Level Cell (TLC) memory blocks, the Quad-Level Cell (QLC), or the likes. The memory cell of the SLC memory block is configured to store one bit of data, the memory cell of the MLC memory block is configured to store two bits of data, the memory cell of the TLC memory block is configured to store three bits of data, the memory cell of the QLC memory block is configured to store four bits of data, and the MLC, TLC and QLC memory blocks may also be referred to as the multiple-level cell memory blocks.

Generally, the memory device 120 may be divided into three regions, comprising a system region, a data region and a spare region. The memory controller 110 is configured to select one or more predetermined memory blocks from the spare region as the cache memories, which may also be called buffers, current blocks or active blocks, to receive data and buffer the data. When a predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC, a TLC or a QLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to a multiple-level cell memory block (the destination memory block) and update the destination memory block as a data block in the data region.

The memory device 120 may store a global Logical-to-Physical (L2P) (or called Host-to-Flash (H2F)) mapping table, for the memory controller 110 to access data in the memory device 120. The global L2P mapping table may be located in a predetermined region within the memory device 120, such as a system region, but the invention is not limited thereto. The global L2P mapping table may be divided into a plurality of local L2P mapping tables, and the local L2P mapping tables may be stored in the same or different memory elements. For example, one memory element may store one local L2P mapping table. When needed, the memory controller 110 may load at least one portion (e.g., a portion or all) of the global L2P mapping table into the buffer memory 116 or other memories. For example, the memory controller 110 may load a local L2P mapping table to be a temporary L2P mapping table, for the memory controller 110 to access data in the memory device 120 according to local L2P mapping table, but the invention is not limited thereto.

The global or local L2P mapping table (hereinafter collectively called the L2P mapping table) stored in the memory device 120 may comprises a plurality of fields, one field of the L2P mapping table is configured to record mapping information of one logical address, where one logical address may correspond to one logical page. The mapping information of a logical address or a logical page recorded in the L2P mapping table is the logical-to-physical mapping information regarding which physical address of the memory device stores data of the corresponding logical address or logical page.

In an embodiment of the invention, the host device 130 and the data storage device 100 may adopt the HPB (Host Performance Booster) series standards which use a memory at the host device side (such as the DRAM of the host device

130) to temporarily store the mapping information maintained by the UFS device (such as the data storage device 100 implemented in compliance with the UFS standards). The mapping information may be retrieved from the global or local L2P mapping table. With the aid of the mapping information, the host device 130 may issue specific read commands (hereinafter called the HPB READ commands) carrying information regarding physical addresses (such as the physical block addresses (PBAs)), which are carried in the HPB entries, corresponding to logical addresses (such as the logical block addresses (LBAs)) that the host device 130 attempts to read to read data. In this manner, as compared to the normal read command, the memory controller 110 could save the time required to read and load the global or local L2P mapping table from the memory device 120 and save the time to search the physical addresses corresponding to the logical addresses that the host device 130 attempts to read in the loaded L2P mapping table. Therefore, the read performance can be improved.

Figure 2:
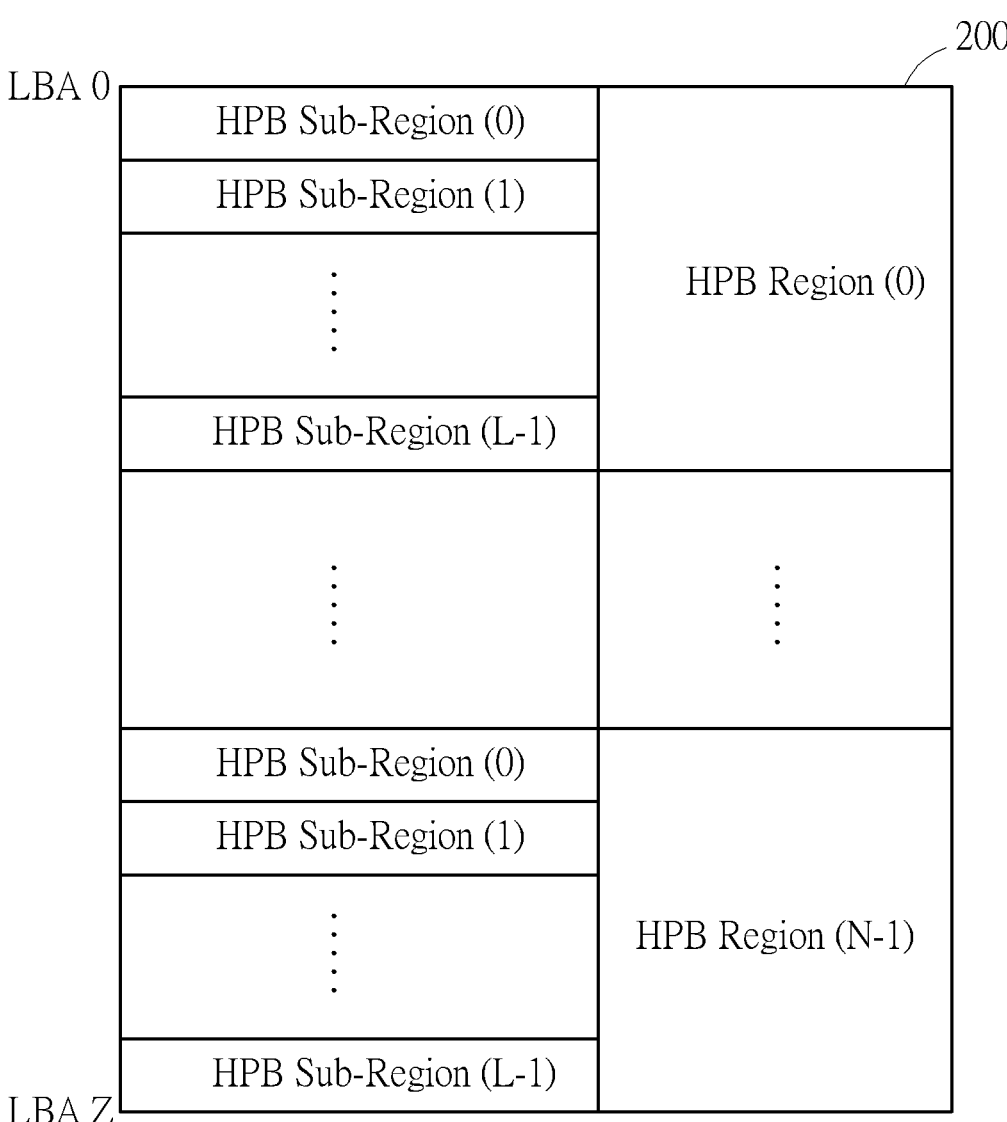
FIG. 2 is a schematic diagram showing an exemplary logical unit and its corresponding LBAs.

In the embodiments of the invention, the memory device 120 may be logically divided into several partitions, each partition may be regarded as a logical unit. Therefore, the memory blocks of the memory device 120 may correspond to a plurality of logical units, and each logical unit may correspond to a plurality of LBAs. FIG. 2 is a schematic diagram showing an exemplary logical unit 200 and its corresponding LBAs. The LBAs (such as the LBAs LBA 0-LBA Z, where Z is a positive integer) corresponding to each logical unit may be divided into a plurality of HPB Regions (such as the HPB Region (0)-HPB Region (N−1), where N is a positive integer and greater than 1), and each HPB Region may be further divided into a plurality of HPB Sub-Regions (such as the HPB Sub-Region (0)-HPB Sub-Region (L−1), where L is a positive integer). The size of one HPB Sub-Region (hereinafter called a Sub-Region for brevity) may be smaller than or equal to the size of one HPB Region (hereinafter called a Region for brevity).

In the embodiments of the invention, there are two modes for obtaining the HPB entries, including the Host control mode and the Device control mode.

Figure 3:
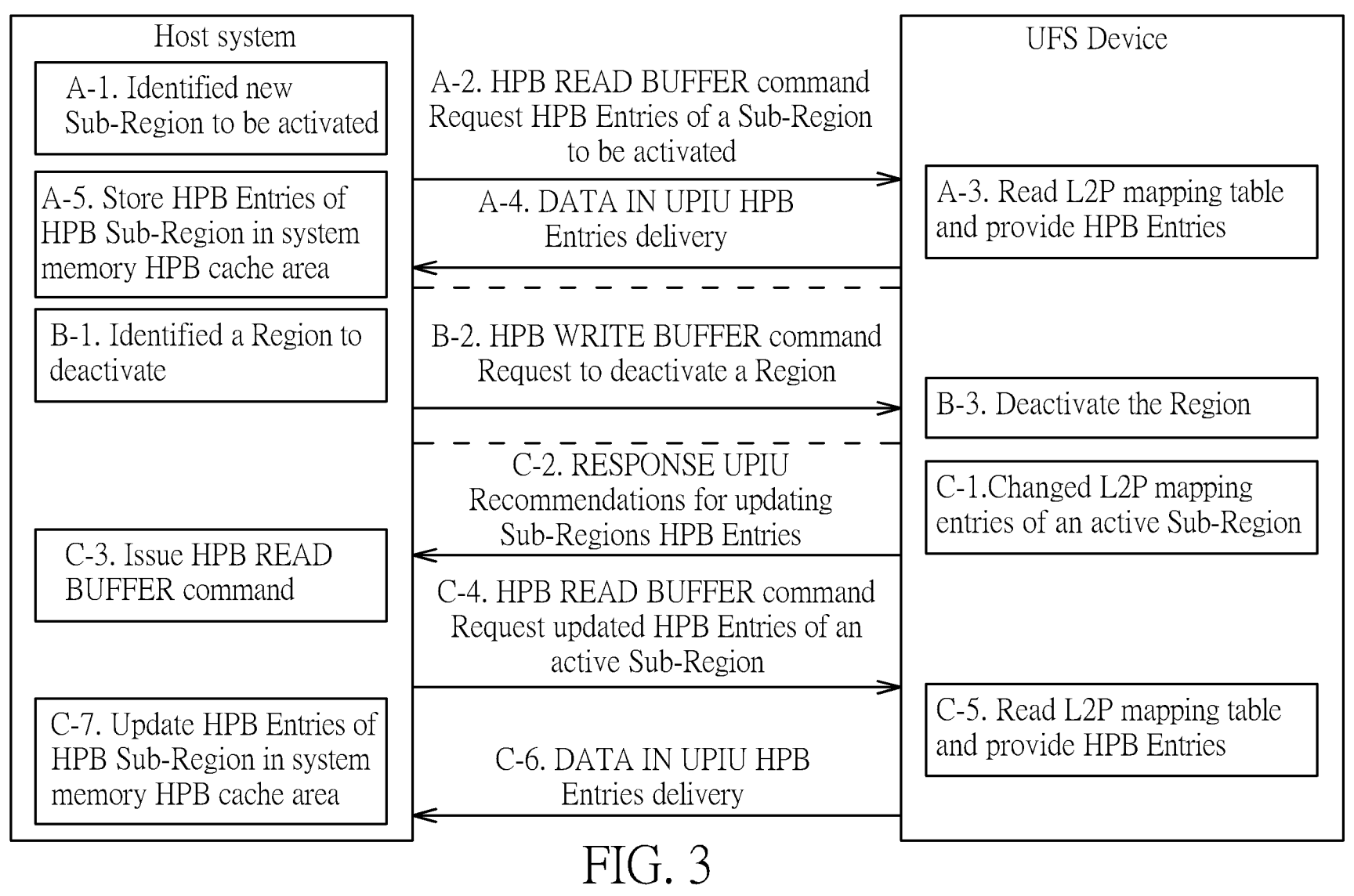

FIG. 3 is a schematic diagram showing operations under the Host control mode. In the Host control mode, the host system (such as the host device 130) may identify the new Sub-Region to be activated (e.g., the operation A-1) and issue an HPB READ BUFFER command to request the HPB entries of the Sub-Region to be activated (e.g., the operation A-2). In response to reception of the HPB READ BUFFER command, the UFS device (such as the memory controller 110) may read at least a portion of the L2P mapping table (such as the global L2P mapping table or the local L2P mapping table) corresponding to the designated Sub-Region to be activated from the memory device 120 and provide the HPB entries based on the mapping information recorded in the L2P mapping table (e.g., the operation A-3). The UFS device may then deliver the HPB entries via a DATA IN UFS Protocol Information Unit (UPIU) packet to the host system (e.g., the operation A-4). The host system may allocate an HPB area (also referred to as an HPB cache area) in a system memory for storing the HPB entries (e.g., the operation A-5).

The host system may also identify the Region to deactivate (e.g., the operation B-1) and issue an HPB WRITE BUFFER command to request to deactivate a Region (e.g., the operation B-2). In response to reception of the HPB WRITE BUFFER command, the UFS device may deactivate the Region (e.g., the operation B-3).

In addition, when the UFS device determines that update of the HPB entries of any Sub-Region is required, for example, when the UFS device has changed the L2P mapping information (e.g., L2P mapping entries) of an active Sub-Region (e.g., the operation C-1), the UFS device may transmit a RESPONSE UPIU packet to the host system for recommendation for updating Sub-Regions HPB entries (e.g., the operation C-2). The host system may issue an HPB READ BUFFER command in response to reception of the RESPONSE UPIU packet (e.g., the operation C-3) and transmit the HPB READ BUFFER command to the UFS device to request updated HPB entries of an active Sub-Region (e.g., the operation C-4). In response to reception of the HPB READ BUFFER command, the UFS device may read the portion of the L2P mapping table associated with the active Sub-Region and provide the HPB entries based on the mapping information recorded in the L2P mapping table (e.g., the operation C-5). Similarly, the UFS device may deliver the HPB entries via a DATA IN UPIU packet to the host system (e.g., the operation C-6). The host system may update the HPB entries of the HPB Sub-Region stored in the system memory HPB cache area based on the received information (e.g., the operation C-7).

Figure 4:
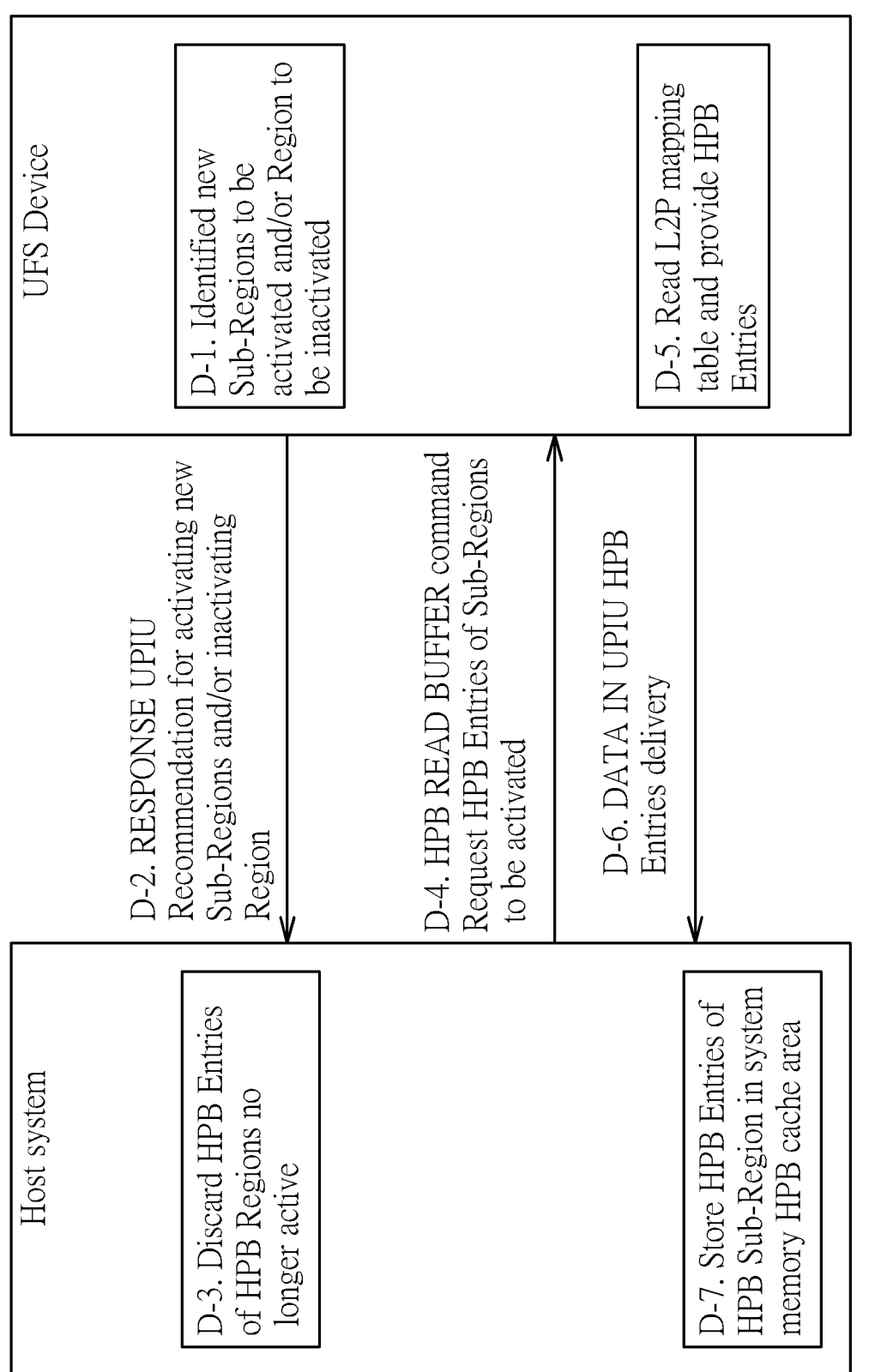
FIG. 4 is a schematic diagram showing operations under the Device control mode.

FIG. 4 is a schematic diagram showing operations under the Device control mode. In the Device control mode, the UFS device may identify the new Sub-Regions to be activated and/or a Region to be inactivated (e.g., the operation D-1) and transmit a RESPONSE UPIU packet to the host system for recommendation for activating the new Sub-Regions and/or inactivating the Region (e.g., the operation D-2). Regarding inactivating the Region, in response to reception of the RESPONSE UPIU packet, the host system may discard the HPB entries of the HPB Regions no longer active (e.g., the operation D-3). Regarding activating the new Sub-Regions, the host system may issue an HPB READ BUFFER command to the UFS device to request the HPB entries of the new Sub-Regions to be activated (e.g., the operation D-4). Similarly, in response to reception of the HPB READ BUFFER command, the UFS device may read at least a portion of the L2P mapping table (such as read the global L2P mapping table or the local L2P mapping table) corresponding to the designated Sub-Region to be activated from the memory device 120 and provide the HPB entries based on the mapping information recorded in the L2P mapping table (e.g., the operation D-5). The UFS device may then deliver the HPB entries via a DATA IN UPIU packet to the host system (e.g., the operation D-6). The host system may allocate an HPB area (also referred to as an HPB cache area) in a system memory for storing the HPB entries (e.g., the operation D-7).

FIG. 5 is a schematic diagram showing an exemplary format for an HPB entry. In an exemplary embodiment, the size of one HPB entry is 8 Bytes. In this exemplary format, four bytes may be utilized to carry the mapping information (for example, the physical address) obtained from the L2P mapping table (such as the global or local L2P mapping table, or a temporary L2P mapping table loaded by the memory controller 110 in the buffer memory 116), and the other four bytes may be utilized to carry another physical address indicating where the aforementioned global or local L2P mapping table is physically stored in the flash memory. To be more specific, in the exemplary format shown in FIG. 5, the first 4 bytes PBA and the second 4 bytes PBA are combined to form an HPB entry. The first PBA is a PBA recorded in the Table 1 (also referred to as the T1 table), and this PBA is mapped by an LBA. The second PBA is a PBA recorded in the Table 2 (also referred to as the T2 table), and this PBA is the PBA of the T1 table. Here, the T1 table may be the global or local L2P mapping table stored in the memory device 120, and the T2 table may be a system table recording the corresponding addresses at which the management tables (for example, the global or local L2P mapping tables) are physically stored in the memory device 120.

Because the memory controller 110 may allocate another memory space to store a management table (such as the global or local L2P mapping table) when the content (such as the mapping information) of this management table has to be updated, when the PBA mapped by an LBA is changed, not only the content of the T1 table is modified but also the updated T1 table is stored in a new space of the memory device 120. Therefore, the corresponding physical address of the T1 table recorded in the system table may change as well. In this manner, the content of the T2 table carried in an HPB entry (e.g., the "Content from Table 2" as shown in FIG. 5) may be utilized to verify if the data stored in a PBA mapped by an LBA corresponding to (or, associated with) this HPB entry is still valid. When the content of the T2 table carried in the HPB entry is the same as the corresponding physical address of the latest T1 table maintained by the memory controller 110, the data stored in this PBA, that is, the content of the T1 table carried in the HPB entry, (e.g., the "Content from Table 1" as shown in FIG. 5) is regarded as valid. Otherwise, the data stored in this PBA carried in the HPB entry is regarded as invalid. Noted that verification of whether the data of a PBA is still valid may be performed by the memory controller 110 at the data storage device side.

FIG. 6 is a schematic diagram showing another exemplary format for an HPB entry. In this exemplary format, 28 bits may be utilized to carry the mapping information obtained from L2P mapping table (such as the global or local L2P mapping table, or a temporary L2P mapping table loaded by the memory controller 110 in the buffer memory 116), 24 bits may be utilized to carry the physical address where the global or local L2P mapping table is physically stored in the flash memory, and the remaining 12 bits may be utilized to carry the continuity information regarding the associated LBA. To be more specific, in the exemplary format shown in FIG. 6, a first PBA is combined with a second PBA and the continuity information of an LBA to form an HPB entry. The first PBA is a PBA stored in T1 table and is the PBA mapped by the associated LBA (e.g., the "Content from Table 1" as shown in FIG. 6). The second PBA is a PBA stored in T2 table and is the PBA of this T1 table (e.g., the "Content from Table 2" as shown in FIG. 6). In the embodiments of the invention, the continuity information may be represented as a value indicating a continuous length or a continuous bit table (e.g., the "Continuous Length" as shown in FIG. 6).

In an embodiment of the invention, the memory controller 110 may calculate and generate (e.g., record and/or update) the number of continuous physical addresses coming after the physical address of an HPB entry among the associated physical addresses in the HPB entry table, to be the continuous length. For example, assuming that the physical addresses carried in the HPB entries 0-7 are {0x000A000, 0x000A001, 0x000A002, 0x000A003, 0x000A004, 0x000A005, 0x000B009, 0x000A007}, the number of the continuous physical addresses {0x000A001, 0x000A005} coming after the physical address 0x000A000 is 5. Therefore, in this example, the continuous length of the HPB entry 0 is 0x5.

In another embodiment of the invention, the memory controller 110 may check respectively continuity of multiple subsequent physical addresses coming after the physical address of an HPB entry among the associated physical addresses in the HPB entry table, to generate the continuous bit table indicating the respective continuity of the multiple subsequent physical addresses. For example, assuming that the physical addresses carried in the HPB entries 0-12 are {0x000A000, 0x000A001, 0x000A002, 0x000A003, 0x000A004, 0x000A005, 0x000B009, 0x000A007, 0x000A008, 0x000A009, 0x000A00A, 0x000B00A, 0x000A00C}, regarding the HPB entry 0, the memory controller 110 may check respectively continuity of 12 subsequent physical addresses coming after the physical address 0x000A000 to generate the continuous bit table 0xBDF indicating the respective continuity of the 12 subsequent physical addresses. The continuous bit table 0xBDF may be expanded as 101111011111, starting from the least significant bit (LSB) to the most significant bit (MSB) thereof, where the bit value '0' represents discontinuity and the bit value '1' represents continuity. Therefore, the continuous bit table 0xBDF of the HPB entry 0 may indicate that the HPB entries 1-5 carry continuous physical addresses, the HPB entries 7-10 carry continuous physical addresses, and the HPB entry 12 and one or more HPB entries after the HPB entry 12 carry continuous physical addresses.

Figure 7:
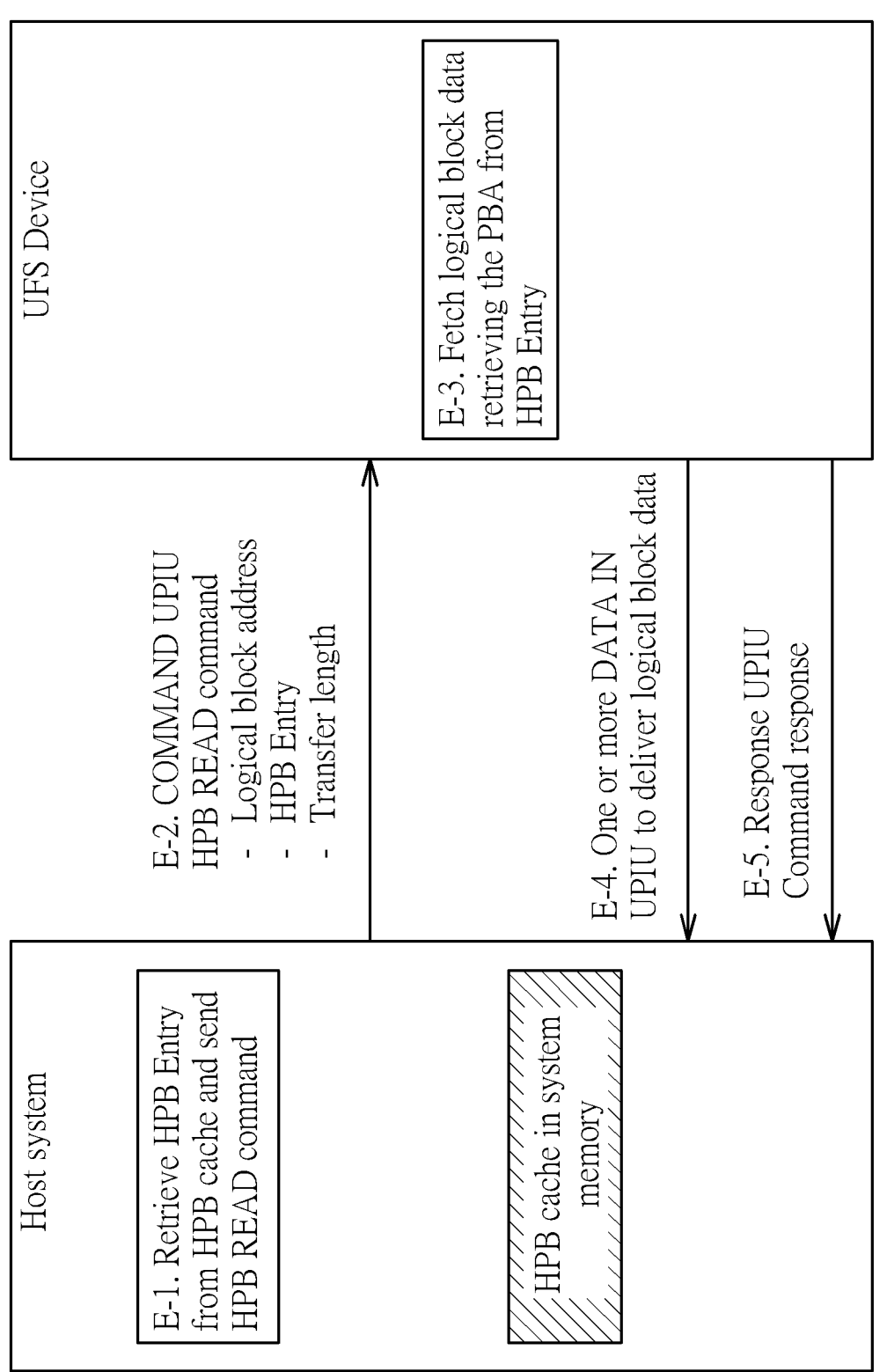
FIG. 7 is a schematic diagram showing operations corresponding to the HPB READ command.

With the aid of the HPB entries, the host device 130 may issue the HPB READ commands carrying information regarding a starting logical address that the host device 130 attempts to read, a transfer length and the HPB entry to read data. FIG. 7 is a schematic diagram showing operations corresponding to the HPB READ command. The host system may retrieve HPB entry from the HPB cache and send an HPB READ command (e.g. the operation E-1) carrying an LBA (such as the starting LBA), the HPB entry corresponding to this LBA and a TRANSFER LENGTH via an HPB READ command UPIU packet to the UFS device (e.g. the operation E-2). In a specific embodiment, the TRANS-FER LENGTH is limited to 1, but the invention should not be limited thereto. In other embodiments of the invention, the TRANSFER LENGTH may be any positive integer. For example, in the HPB 2.0 standards, the TRANSFER LENGTH may be set to a positive integer greater than 1. Upon receiving the HPB READ command, the UFS device may decode the received HPB entry corresponding to the designated LBA that the host system attempts to read to obtain information regarding the physical address or the PBA of the designated LBA and access the memory device according to the physical address or the PBA to obtain or fetch the data that the host system attempts to read (e.g. the operation E-3). The UFS device may determine whether the received HPB entry is stall valid in the operation E-3. For example, the UFS device may determine whether the received HPB entry is stall valid by determining whether the content of the T2 table carried in the HPB entry is the same as the corresponding physical address of the latest T1 table maintained by the memory controller 110. When the received HPB entry is determined stall valid, the USF device may obtain the data that the host device 130 attempts to read (e.g. the "logical block data" shown in FIG. 6) and transmit one or more DATA IN UPIU packets to the host system to deliver the data to the host system (e.g. the operation E-4) and transmit a RESPINSE UPIU Command to the host system (e.g. the operation E-5) after the data delivery, where the "logical block data" refers to the data corresponding to the LBA that the host device 130 attempts to read. On the other hand, when the received HPB entry is determined invalid, the UFS device may skip the operation E-4 and directly perform the operation E-5 to recommend for updating the corresponding the HPB entries by transmitting a RESPINSE UPIU Command packet to the host system.

It should be noted that in some embodiments of the invention, the UFS device may actively recommend the host system to update the HPB entry, for example, as in the operation C-2, the UFS device may transmit a RESPONSE UPIU packet to the host system for recommendation for updating Sub-Regions HPB entries, or as in the operation D-2, the UFS device may transmit a RESPONSE UPIU packet to the host system for recommendation for activating the new Sub-Regions. In other embodiments of the invention, the UFS device may also not actively recommend the host system to update the HPB entry. In such embodiments, the UFS device may transmit a RESPONSE UPIU packet to the host system for recommending the host system to update the HPB entry after determining that the corresponding HPB entry is invalid. For example, upon receiving the HPB READ command, the UFS device may recommend the host system to update the HPB entry by transmitting a RESPONSE UPIU packet to the host system when determining that the received HPB entry is invalid in the afore-mentioned operation E-3.

Since the TRANSFER LENGTH may be set to a positive integer greater than 1, that is, the host device 130 may attempt to read the data of more than one LBA, in some embodiments of the invention, the memory controller 110 may record and/or analyze the access behaviors of the host device 130, select one or more Sub-Regions having data to be rearranged based on the recorded access behaviors and actively perform a data rearrangement procedure to move or rewrite data of the selected one or more Sub-Regions to a memory space (for example, a memory block) of the memory device 120 having continuous physical addresses, to improve the continuity of the data corresponding to the continuous logical addresses actually being stored in the memory device 120.

According to an embodiment of the invention, the memory controller 110 may establish an activated count table (such as a Sub-Region activated count table) and maintain or update the content of the activated count table in response to the commands issued by the host device 130. The activated count table may comprise a plurality of fields. Each field may be configured to record an activated count that is associated with one Sub-Region (e.g. the HPB Sub-Region). Therefore, the number of fields in the activated count table may be equal to the total number of HPB Sub-Regions comprised in the memory device 120. As discussed above, the memory device 120 may be divided into several partitions, and each partition may be regarded as a logical unit corresponding to a plurality of LBAs. The LBAs of each logical unit may be divided into a plurality of HPB Regions, and each HPB Region may be further divided into a plurality of HPB Sub-Regions. Therefore, in the embodiments of the invention, each logical unit may comprise a plurality of regions and each region may comprise a plurality of sub-regions.

In some embodiments of the invention, the activated count associated with one Sub-Region is utilized to record the number of times that the associated Sub-Region is activated by the host device 130. For example, the activated count may be a count value for counting the number of times that the associated Sub-Region is requested to be activated. According to an embodiment of the invention, the memory controller 110 may update the content of the activated count table in response to the HPB READ BUFFER commands issued by the host device 130. As discussed above, the host system (such as the host device 130) may identify the new Sub-Region to be activated and issue the HPB READ BUFFER command to request the HPB entries of the Sub-Region to be activated. Therefore, one or more Sub-Regions to be activated may be identified by the host device 130 and carried in the HPB READ BUFFER command, or some related information may be carried in the HPB READ BUFFER command. In response to reception of the HPB READ BUFFER command, the memory controller 110 may update the content of the activated count table by increasing one or more activated counts (e.g. +1 for each activation) associated with the one or more Sub-Regions identified to be activated in the command.

According to an embodiment of the invention, the memory controller 110 may select one or more Sub-Regions having the activated counts greater than a predetermined value or a threshold value as the one or more Sub-Regions to be rearranged. According to another embodiment of the invention, the memory controller 110 may further sort the activated counts recorded in the activated count table and select one or more Sub-Regions having data to be rearranged according to the sorted activated counts. For example, the memory controller 110 may sequentially select the Sub-Region(s) having the greatest activated count according to the sorted activated counts and perform a corresponding data rearrangement procedure on the selected Sub-Region(s), and then remove the activated count of the selected Sub-Region(s) that has been rearranged from the sorted activated counts. The selection and data rearrangement procedure may be repeatedly performed on different Sub-Regions when required.

In addition, according to another embodiment of the invention, the memory controller 110 may establish a read count table (such as a Sub-Region read count table) and maintain or update the content of the read count table in response to the read commands issued by a host device 130, where a read command carries at least one designated logical address. The read count table may comprise a plurality of fields. Each field may be configured to record a read count that is associated with one Sub-Region (e.g. the HPB Sub-Region). Therefore, the number of fields in the read count table may be equal to the total number of HPB Sub-Regions comprised in the memory device 120.

In the some embodiments of the invention, the read count associated with one Sub-Region is utilized to record the number of times that the associated Sub-Region is read by the host device 130. For example, the read count may be a count value for counting the number of times that the host device 130 issues the commands to read the data of the logical addresses comprised in the associated Sub-Region. According to an embodiment of the invention, the memory controller 110 may update the content of the read count table in response to the normal read commands issued by the host device 130. In response to reception of a read command carrying a starting LBA and a data length to be read, the memory controller 110 may update the content of the read count table by increasing (e.g. +1 for each read command) one or more read counts associated with the one or more Sub-Regions that the at least one designated logical address (such as the starting LBA and the subsequent LBA(s) derived from the starting LBA and the data length) belongs to. According to another embodiment of the invention, the memory controller 110 may update the content of the read count table in response to the read commands issued by the host device 130 with the data length greater than a predetermined length threshold, for designating more than one logical address to be read. For example, the memory controller 110 may update the content of the read count table by increasing (e.g. +1 for each read command) one or more read counts associated with the one or more Sub-Regions that the designated logical addresses (such as the starting LBA and the subsequent LBA(s) derived from the starting LBA and the data length) belong to.

According to an embodiment of the invention, the memory controller 110 may select one or more Sub-Regions having the read counts greater than a predetermined value or a threshold value as the one or more Sub-Regions to be rearranged. According to another embodiment of the invention, the memory controller 110 may further sort the read counts recorded in the read count table and select one or more Sub-Regions having data to be rearranged according to the sorted read counts. For example, the memory controller 110 may sequentially select the Sub-Region(s) having the greatest read count according to the sorted read counts and perform a corresponding data rearrangement procedure on the selected Sub-Region(s), and then remove the read count of the selected Sub-Region(s) that has been rearranged from the sorted read counts. The selection and data rearrangement procedure may be repeatedly performed on different Sub-Regions when required.

According to another embodiment of the invention, the memory controller 110 may calculate an average read count according to the read counts recorded in the read count table and select the at least one sub-region to be rearranged according to the average read count. For example, the memory controller 110 may select one or more Sub-Regions having the read counts greater than the average read count as the one or more Sub-Regions to be rearranged.

According to yet another embodiment of the invention, the memory controller 110 may establish another read count table (such as a Sub-Region HPB read count table) (for distinguishing from the read count table in the second embodiment, hereinafter called HPB read count table) and maintain or update the content of the HPB read count table in response to the HPB READ commands issued by a host device 130, with or carrying a TRANSFER LENGTH greater than 1 for designating more than one logical address to be read. The HPB read count table may comprise a plurality of fields. Each field may be configured to record a HPB read count that is associated with one Sub-Region (e.g. the HPB Sub-Region). Therefore, the number of fields in the HPB read count table may be equal to the total number of HPB Sub-Regions comprised in the memory device 120.

In some embodiments of the invention, the HPB read count associated with one Sub-Region is utilized to record the number of times that the associated Sub-Region is read by the host device 130 via an HPB READ command. For example, the HPB read count may be a count value for counting the number of times that the host device 130 issues the HPB read commands to read the data of the logical addresses comprised in the associated Sub-Region. According to an embodiment of the invention, the memory controller 110 may update the content of the HPB read count table in response to the HPB READ commands issued by the host device 130 with a TRANSFER LENGTH greater than 1. In response to reception of an HPB READ command carrying a starting LBA and a TRANSFER LENGTH greater than 1, the memory controller 110 may update the content of the HPB read count table by increasing (e.g. +1 for each HPB READ command) one or more HPB read counts associated with the one or more Sub-Regions that the logical addresses designated in the HPB read command (such as the starting LBA and the subsequent LBAs derived from the starting LBA and the TRANSFER LENGTH) belong to.

According to an embodiment of the invention, the memory controller 110 may select one or more Sub-Regions having the HPB read counts greater than a predetermined value or a threshold value as the one or more Sub-Regions to be rearranged. According to another embodiment of the invention, the memory controller 110 may further sort the HPB read counts recorded in the HPB read count table and select one or more Sub-Regions having data to be rearranged according to the sorted HPB read counts. For example, the memory controller 110 may sequentially select the Sub-Region(s) having the greatest HPB read count according to the sorted HPB read counts and perform a corresponding data rearrangement procedure on the selected Sub-Region(s), and then remove the HPB read count of the selected Sub-Region(s) that has been rearranged from the sorted HPB read counts. The selection and data rearrangement procedure may be repeatedly performed on different Sub-Regions when required.

According to another embodiment of the invention, the memory controller 110 may calculate an average HPB read count according to the HPB read counts recorded in the HPB read count table and select the at least one Sub-Region to be rearranged according to the average HPB read count. For example, the memory controller 110 may select one or more Sub-Regions having the HPB read counts greater than the average HPB read count as the one or more Sub-Regions to be rearranged.

It is to be noted that, in yet some other embodiments of the invention, the memory controller 110 may maintain more than one of the aforementioned activated count table, the read count table and the HPB read count table at the same time, and may select one or more Sub-Regions to be rearranged based on any combination of the content recorded in the activated count table, the read count table and/or the HPB read count table. For example, the memory controller 110 may sum up the activated count, the read count and/or the HPB read of each Sub-Region recorded in the corresponding count tables and sort the summation results to make the aforementioned selection for data rearrangement. For another example, the memory controller 110 may calculate an average value of the activated count, the read count and/or the HPB read of each Sub-Region recorded in the corresponding count tables and sort the average results to make the aforementioned selection for data rearrangement.

In the embodiments of the invention, the data rearrangement procedure (e.g. the data rearrangement procedure in any of the aforementioned embodiments) may be a garbage collection procedure or may be combined in a garbage collection procedure, and the selection of the Sub-Regions to be rearranged may be triggered when a garbage collection procedure is triggered. To be more specific, when any condition that is capable of triggering a garbage collection procedure is met (for example, when the number of spare memory blocks is lower than a predetermined spare block threshold), besides selecting the source memory blocks having valid data to be moved (or, removed or rewritten) to the destination memory block, the memory controller 110 may further select one or more Sub-Regions to be rearranged and perform the corresponding data rearrangement procedure to move (or, remove or rewrite) data of the selected one or more Sub-Regions to a memory space having continuous physical addresses.

In other embodiments of the invention, the data rearrangement procedure may also be combined in other data moving procedure, such as a wear leveling procedure for moving the data of one or more memory blocks having the erase count greater than a predetermined erase count threshold to the memory blocks having relatively lower erase count, a read reclaim procedure for moving the data having the number of ECC error bits greater than a predetermined error bit threshold to a new memory block, a read refresh procedure for moving the data having a read count greater than a predetermined read count threshold to a new memory block, or the likes. In addition, the selection of the Sub-Regions to be rearranged may also be triggered when the data moving procedure is triggered.

In yet other embodiments of the invention, the data rearrangement procedure may also be performed when the data storage device 100 is idle (for example, when the data storage device 100 has not received any commands from the host device 130 for a predetermined period, the data storage device 100 may enter the idle state).

According to an embodiment of the invention, after selecting one or more Sub-Regions to perform a data rearrangement procedure according to the activated counts/the read counts/the HPB read counts recorded in the activated count table/the read count table/the HPB read count table, or according to the sorted activated counts/the sorted read counts/the sorted HPB read counts as described in the aforementioned embodiments, the memory controller 110 may further determine whether to exclude one or more Sub-Regions from the selected Sub-Regions. As an example, combining the aforementioned embodiments, in a first embodiment of the invention, for a Sub-Region having the data that is frequently updated, the memory controller 110 may determine not to perform data rearrangement procedure thereon. That is, the memory controller 110 may exclude this Sub-Region from the selected Sub-Regions, so as to avoid excessively consuming service life of the memory blocks due to frequently performing data rearrangement on this Sub-Region. In a second embodiment of the invention, for a Sub-Region configured by the host device 130 to store management data of a file system, the memory controller 110 may determine not to perform data rearrangement procedure thereon. That is, the memory controller 110 may exclude this Sub-Region from the selected Sub-Regions, so as to avoid excessively consuming service life of the memory blocks due to frequently performing data rearrangement on this Sub-Region. In a third embodiment of the invention, the memory controller 110 may exclude both the Sub-Region(s) having frequently updated data and the Sub-Region(s) storing management data of a file system.

Figure 8:
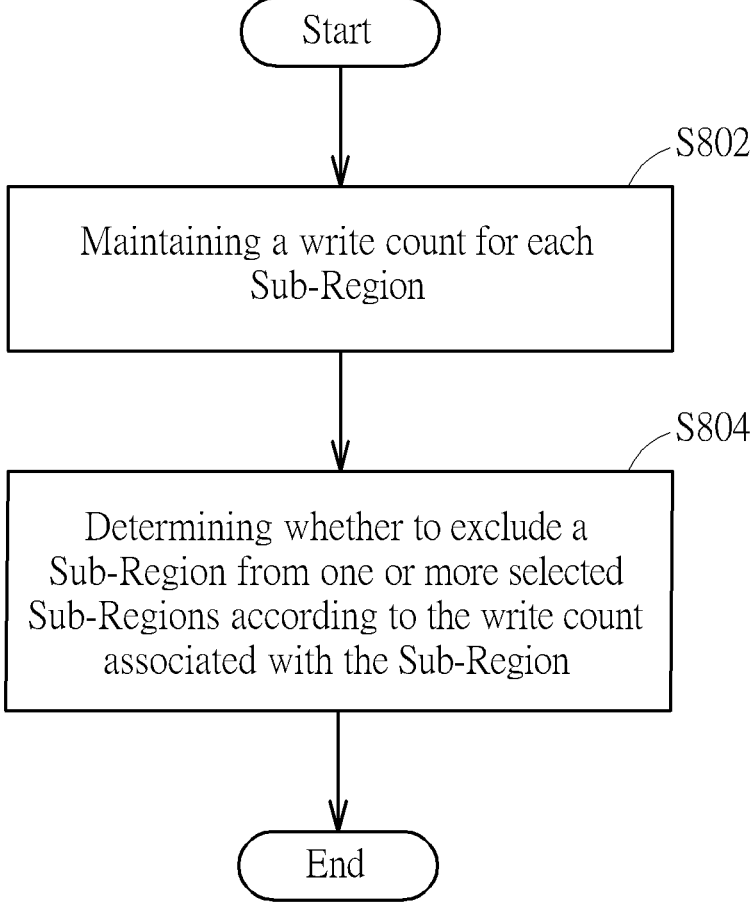
FIG. 8 shows an exemplary flow chart of a data processing method according to the first embodiment of the invention.

FIG. 8 shows an exemplary flow chart of a data processing method according to the first embodiment of the invention. The proposed data processing method is applicable for a data storage device, such as the data storage device 100, and may comprise the following steps performed by the memory controller 110:

Step S802: maintaining a write count W_Cnt for each Sub-Region, such as each of the aforementioned HPB Sub-Regions HPB_Sub_Rgn_0~HPB_Sub_Rgn_(L−1).

Step S804: determining whether to exclude a Sub-Region from one or more selected Sub-Regions according to the write count W_Cnt associated with the Sub-Region. The one or more selected Sub-Regions may be the Sub-Regions selected to perform a data rearrangement procedure as mentioned above, and when the Sub-Region is determined as a hot-write Sub-Region according to the write count W_Cnt associated with the Sub-Region, the Sub-Region is excluded from the one or more selected Sub-Regions. In other words, even if the Sub-Region has been selected to perform the data rearrangement procedure according to the activated counts/the read counts/the HPB read counts recorded in the activated count table/the read count table/the HPB read count table, or according to the sorted activated counts/the sorted read counts/the sorted HPB read counts as described above, since the Sub-Region is then determined as a hot-write Sub-Region, this Sub-Region will be excluded from the one or more Sub-Regions selected to perform data rearrangement procedure and the memory controller 110 will not perform the data rearrangement procedure on this Sub-Region.

On the other hand, when determining that a Sub-Region selected to perform the data rearrangement procedure is not a hot-write Sub-Region, the memory controller 110 will perform the data rearrangement procedure on the Sub-Region to move data corresponding to logical addresses belonging to the Sub-Region to a memory space of the memory device having continuous physical addresses.

Regarding details of selecting one or more Sub-Regions to perform the data rearrangement procedure and details of the data rearrangement procedure, reference may be made to the above paragraphs and will be omitted here for brevity.

According to an embodiment of the invention, the memory controller 110 may maintain a Sub-Region write count table Sub_Rgn_W_Cnt_Tab and update content of the Sub-Region write count table Sub_Rgn_W_Cnt_Tab in response to a write command issued by the host device 130. The Sub-Region write count table Sub_Rgn_W_Cnt_Tab may comprise a plurality of fields. Each field is configured to record the write count W_Cnt that is associated with one Sub-Region and the memory controller 110 may update the content of the Sub-Region write count table Sub_Rgn_W_Cnt_Tab by increasing the write count(s) W_Cnt associated with the Sub-Region(s) that logical addresses designated in the write command belong to.

To be more specific, in response to reception of a write command carrying a starting LBA and a data length to be written (hereinafter called the write length), the memory controller 110 may update the content of the Sub-Region write count table Sub_Rgn_W_Cnt_Tab by increasing (e.g. +1 for each write) one or more write counts W_Cnt associated with the one or more Sub-Regions that the designated logical address(es) (such as the starting LBA and the subsequent LBA(s) derived from the starting LBA and the write length) belongs to. It is to be noted that, in response to one write command, the write count W_Cnt associated with one Sub-Region is increased by 1 at most.

According to another embodiment of the invention, the memory controller 110 may maintain a logic write count table LWC_Tab and update content of the logic write count table LWC_Tab in response to a write command issued by the host device 130. The logic write count table LWC_Tab may comprise a plurality of fields. Each field is configured to record a write count that is associated with a logical address, and the memory controller 110 may update the content of the logic write count table LWC_Tab by increasing the write count(s) associated with one or more logical addresses designated in the write command, and maintains the write count W_Cnt for each sub-region according to the content of the logic write count table LWC_Tab.

To be more specific, in response to reception of a write command carrying a starting LBA and a data length to be written (hereinafter called the write length), the memory controller 110 may derive the logical addresses designated in the write command according to the starting LBA and the write length and update the content of the logic write count table LWC_Tab by increasing (e.g. +1 for each write) the write counts associated with the designated logical addresses, and sum up the write counts of all the logical addresses within the range of logical addresses covered by a Sub-Region to derive the write count W_Cnt associated with the Sub-Region.

According to an embodiment of the invention, the memory controller 110 may determine whether a Sub-Region selected to perform the data rearrangement procedure is a hot-write sub-region by determining whether the write count W_Cnt associated with the selected Sub-Region is greater than a threshold. For example, besides maintaining a write count W_Cnt for each Sub-Region, the memory controller 110 may further calculate an average of the write counts associated with the Sub-Regions and set the average as the threshold. It is to be noted that since the write count W_Cnt associated with each Sub-Region is not a fixed value but a variable value that increases with the use of data storage device 100, the aforementioned average is not a fixed value, either, and the memory controller 110 may keep calculating the lasted average and set it as the aforementioned threshold.

In addition, the memory controller 110 may also calculate an average of the write counts W_Cnt associated with the Sub-Regions according to a total write bytes (TWB). As an example, the total write bytes TWB may be a summation obtained by accumulating the amount of data being written into the data storage device 100 in each write operation from a specific time point (for example, from the time when the data storage device 100 is loaded with the ISP code and initialized). Assuming that a capacity of the memory device 120 is 128 GB (bytes), but the total amount of written data is 256 GB, it will be readily appreciated that the average of the write counts per logical address is 2. Further assuming that the size of data corresponding to a logical address is 4 KB, and the capacity corresponding to a HPB Sub-Region is 24 MB, then it can be derived that the range of logical addresses covered by a HPB Sub-Region contains 24*1024/4=6144 logical addresses. Therefore, it can be deduced that the average write count of a HPB Sub-Region is 2*6144=12288, and the memory controller 110 may set the deduced number 12288 as the threshold for determining whether a Sub-Region is a hot-write Sub-Region.

According to another embodiment of the invention, the memory controller 110 may sort the write counts associated with all the Sub-Regions and determine whether the Sub-Region selected to perform the data rearrangement procedure is a hot-write Sub-Regions or not according to the sorted write counts. For example, if the ranking of the write count W_Cnt associated with a Sub-Region among the sorted write counts that were sorted from most to least is less than a predetermined value, the memory controller 110 may determine that the Sub-Region is a hot-write Sub-Region.

In an embodiment of the invention, assuming that the capacity of a physical memory block (that is, a physical block) is 96 MB and the capacity corresponding to a HPB Sub-Region is 24 MB, it means that one physical memory block corresponds to four HPB Sub-Regions, and the memory controller 110 may determine that the Sub-Regions whose write count ranking belong to the top 4*N among all the sorted write counts are hot-write Sub-Regions, where the number 4 is the multiple of the capacity of a physical memory block relative to the capacity of a HPB Sub-Region and N is a positive integer. Therefore, in the embodiments of the invention, the memory controller 110 may set the threshold (that is, the aforementioned predetermined value) utilized for determining whether a Sub-Region is a hot-write Sub-Region according to the sorted write counts based on the relationship between the capacity of a physical memory block and the capacity of a HPB Sub-Region.

Besides the hot-write Sub-Region, the memory controller 110 may also distinguish the system data Sub-Region for storing system data of the host device 130 and exclude the system data Sub-Region(s) from the one or more Sub-Regions selected to perform data rearrangement procedure.

According to an embodiment of the invention, the memory controller 110 may classify the data written in the memory device 120 as management data of a file system and user data, where the management data of the file system is the management data of a file system utilized by the Operating System (OS) of the host device 130 and the management data of the file system may be a file system management table. The file system management table may comprise a plurality of fields for recording the management information of user data. As an example, one field of the file system management table may be utilized to record the file size of each user data and the range of logical addresses corresponding to each user data, wherein one file may correspond to one record. As another example, another field of the file system management table may be utilized to record which data corresponding to which logical addresses of the host system has already been written in the memory device 120 and which logical address of the host system has no corresponding data being written in the memory device 120. According to an embodiment of the invention, the aforementioned host system may refer to a system comprising the host device 130 or comprising the host device 130 and the data storage device 100, or, may refer to a system comprising the host device 130, the data storage device 100 and one or more peripheral devices of the host device 130.

Generally, every time when user data is updated, the host device 130 accordingly updates the management data of the file system, so that the information recorded in the file system management table is the latest management information. When content of any filed in the file system management table has to be updated, the memory controller 110 writes the latest file system management table in the memory device 130. In this manner, in response to the update of the user data, the content of the file system management table is frequently updated as well.

Therefore, in the second embodiment of the invention, the memory controller 110 may distinguish the system data Sub-Region for storing system data of the host device 130 (e.g., the Sub-Region comprising one or more logical addresses configured by the host device 130 to store management data of the file system) from the non-system data Sub-Region among all the HPB Sub-Regions (e.g., the aforementioned HPB Sub-Regions HPB_Sub_Rgn_0~HPB_Sub_Rgn_(L−1)), and after selecting one or more Sub-Regions to perform a data rearrangement procedure according to the activated counts/the read counts/the HPB read counts recorded in the activated count table/the read count table/the HPB read count table, or according to the sorted activated counts/the sorted read counts/the sorted HPB read counts as described in the aforementioned embodiments, the memory controller 110 may further determine whether a selected Sub-Region is a system data Sub-Region. If the determination result shows yes, the memory controller 110 may determine not to perform the data rearrangement procedure on the selected Sub-Region, that is, exclude this Sub-Region from the one or more Sub-Regions selected to perform the data rearrangement procedure, so as to avoid excessively consuming service life of the memory blocks due to frequently performing data rearrangement on this Sub-Region.

Figure 9:
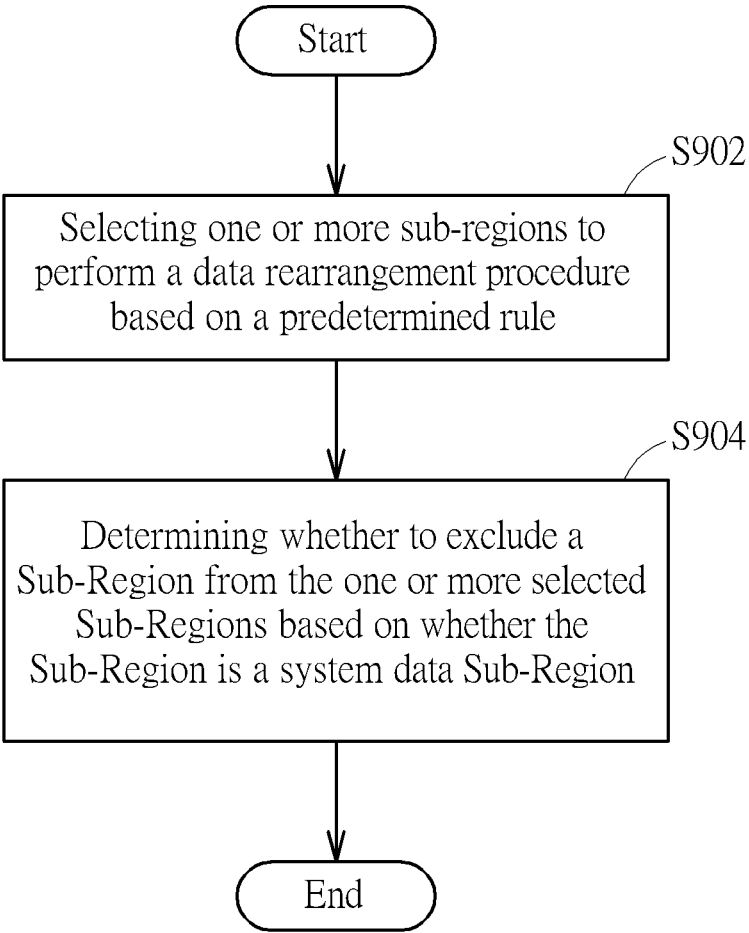
FIG. 9 shows an exemplary flow chart of a data processing method according to the second embodiment of the invention.

FIG. 9 shows an exemplary flow chart of a data processing method according to the second embodiment of the invention. The proposed data processing method is applicable for a data storage device, such as the data storage device 100, and may comprise the following steps performed by the memory controller 110:

Step S902: selecting one or more sub-regions to perform a data rearrangement procedure to move data corresponding to logical addresses belonging to the selected one or more sub-regions to a memory space of the memory device having continuous physical addresses based on a predetermined rule. As an example, in the embodiments combining the aforementioned selecting one or more Sub-Regions to perform a data rearrangement procedure according to the activated counts/the read counts/the HPB read counts recorded in the activated count table/the read count table/the HPB read count table, or according to the sorted activated counts/the sorted read counts/the sorted HPB read counts, the predetermined rule may be that to select one or more Sub-Regions having the associated activated counts/read counts/HPB read counts greater than a threshold to perform the data rearrangement procedure, or to select one or more Sub-Regions to perform the data rearrangement procedure based on the sorted activated counts/the sorted read counts/the sorted HPB read counts.

Step S904: determining whether to exclude a Sub-Region from the selected one or more Sub-Regions based on whether the Sub-Region is a system data Sub-Region. When the Sub-Region is determined as a system data Sub-Region, the Sub-Region is excluded from the selected one or more Sub-Regions. In other words, even if the Sub-Region has been selected to perform the data rearrangement procedure according to the activated counts/the read counts/the HPB read counts recorded in the activated count table/the read count table/the HPB read count table, or according to the sorted activated counts/the sorted read counts/the sorted HPB read counts as described above, since the Sub-Region is determined as a system data Sub-Region, this Sub-Region will be excluded from the one or more Sub-Regions selected to perform data rearrangement procedure and the memory controller 110 will not perform the data rearrangement procedure on this Sub-Region.

On the other hand, when determining that a Sub-Region selected to perform the data rearrangement procedure is not a system data Sub-Region, the Sub-Region is kept in the selected one or more Sub-Regions the memory controller 110 will perform the data rearrangement procedure on the Sub-Region to move data corresponding to logical addresses belonging to the Sub-Region to a memory space of the memory device having continuous physical addresses.

Regarding details of selecting one or more Sub-Regions to perform the data rearrangement procedure according to the activated counts/the read counts/the HPB read counts and details of the data rearrangement procedure, reference may be made to the above paragraphs and will be omitted here for brevity.

In an embodiment, the host device 130 may assign the logical addresses having smaller values (e.g., from the beginning of the logical addresses) for storing the management data of file system. Therefore, the memory controller 110 may start to assign an index (for example, one of the HPB Sub-Region indices 0~(L−1) as shown in FIG. 2) to a corresponding Sub-Region, from the beginning of the logical addresses (for example, the LBA0 shown in FIG. 2), and when an index corresponding to the selected Sub-Region is smaller than a predetermined value, the selected Sub-Region is determined as a system data sub-region.

Assuming that the memory device 120 is a TLC flash memory, the capacity of one physical block is 72 MB and the capacity corresponding to a HPB Sub-Region is 24 MB, the predetermined value may be set to a value such as 3, 6, 9 . . . (that is, the integer multiple of the number of HPB Sub-Region comprised in a physical block). For example, if the memory controller 110 sets the HPB Sub-Regions with corresponding indices 0~2 as the system data Sub-Regions for storing the management data of the file system of the host device 130, the remaining HPB Sub-Regions may be regarded as being utilized to store user data and the predetermined value may be set to 3.

Similarly, assuming that the memory device 120 is a QLC flash memory, the capacity of one physical block is 96 MB and the capacity corresponding to a HPB Sub-Region is 24 MB, the predetermined value may be set to a value such as 4, 8, 12 . . . (that is, the integer multiple of the number of HPB Sub-Region comprised in a physical block). For example, if the memory controller 110 sets the HPB Sub-Regions with corresponding indices 0~3 as the system data Sub-Regions for storing the management data of the file system of the host device 130, the remaining HPB Sub-Regions may be regarded as being utilized to store user data and the predetermined value may be set to 4.

It is to be noted that, in the embodiments of the invention, assigning the logical addresses having smaller values for storing the management data of file system should not be a limit of the invention. As an example, the host device 130 may also assign the logical addresses having greater values (e.g., starting from the end of the logical addresses) for storing the management data of file system. Therefore, in the embodiments of the invention, the way to determine whether a Sub-Region is a system data Sub-Region or not may be flexibly adjusted according to the logical addresses assigned for storing the management data of file system, and the way to determine a system data Sub-Region introduced above should not be a limit of the invention.

For example, the host device 130 may set a specific range of logical addresses and assign the logical addresses within the specific range to a logical memory space for storing the management data of the file system. Therefore, in another embodiment of the invention, when a range of logical addresses covered by the selected Sub-Region overlap (which may be completely overlap or partially overlap) a range of the logical addresses configured by a host device for storing management data of the file system, the selected Sub-Region is determined as a system data Sub-Region.

According to an embodiment of the invention, the host device 130 may notify the memory controller of the logical addresses or the range of logical addresses assigned for storing the management data of a file system in various ways. As described above, the memory controller 130 may communicate with the host device 130 via the host interface 118.

In addition, according to an embodiment of the invention, the management data of the file system is a file system management table.

In addition, in the third embodiment of the invention, after selecting one or more Sub-Regions to perform a data rearrangement procedure based on the predetermined rule as mentioned above, the memory controller 110 may combine the concept of the first embodiment and the second embodiment to determine whether a selected Sub-Region among the selected one or more Sub-Regions is a hot-write Sub-Region or a system data Sub-Region one by one, so as to determine whether to exclude the Sub-Region from the selected one or more Sub-Regions. If a selected Sub-Region is a hot-write Sub-Region or a system data Sub-Region, this Sub-Region will be excluded from the selected one or more Sub-Regions that were selected to perform the data rearrangement procedure and the memory controller 110 will not perform the data rearrangement procedure on this Sub-Region. If the selected Sub-Region is neither a hot-write Sub-Region nor a system data Sub-Region, this Sub-Region will be kept in the selected one or more Sub-Regions that were selected to perform the data rearrangement procedure. Therefore, the memory controller 110 will perform the data rearrangement procedure on this Sub-Region to move data corresponding to logical addresses belonging to this Sub-Region to a memory space of the memory device having continuous physical addresses.

In the embodiments of the invention, the continuity of the data corresponding to the continuous logical addresses actually being stored in the memory device 120 has been improved, that is, by performing the data rearrangement procedure, the data corresponding to the frequently activated Sub-Regions, frequently read Sub-Regions or the Sub-Regions frequently being read via HPB read command will be stored in a memory space having continuous physical addresses. In addition, the Sub-Regions having data that is frequently updated (e.g., the hot-write Sub-Regions) and/or the Sub-Regions for storing the management data of the file system are specially considered to be excluded from the performance of data rearrangement procedure, so as to avoid excessively consuming service life of the memory blocks due to frequently performing data rearrangement on these Sub-Regions. In this manner, efficiency of accessing the data storage device 100 is improved and the service life of the memory device is effectively extended as well.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A data storage device, comprising:
   a memory device, comprising a plurality of memory blocks, wherein the memory blocks correspond to a plurality of logical units, each logical unit corresponds to a plurality of logical addresses, the logical addresses corresponding to each logical unit are divided into a plurality of regions and each region is further divided into a plurality of sub-regions; and
   a memory controller, coupled to the memory device and configured to access the memory device and update content of an activated count table in response to a command issued by a host device, wherein one or more sub-regions to be activated are identified in the command,
   wherein the activated count table comprises a plurality of fields, each field is configured to record an activated count that is associated with one sub-region and the memory controller updates the content of the activated count table by increasing one or more activated counts associated with the one or more sub-regions identified in the command,
   wherein the memory controller is configured to maintain a write count for each sub-region,
   when the memory controller has selected one or more sub-regions to perform a data rearrangement procedure, the memory controller is configured to determine whether a selected sub-region is a hot-write sub-region according to the write count associated with the selected sub-region, wherein when the memory controller determines that the selected sub-region is not the hot-write sub-region, the memory controller is configured to perform the data rearrangement procedure on the selected sub-region to move data corresponding to logical addresses belonging to the selected sub-region to a memory space of the memory device having continuous physical addresses, and when the memory controller determines that the selected sub-region is the hot-write sub-region, the memory controller is configured not to perform the data rearrangement procedure on the selected sub-region, and wherein the memory controller is further configured to select the one or more sub-regions to perform the data rearrangement procedure according to the content of the activated count table.

2. The data storage device as claimed in claim 1, wherein the memory controller is further configured to maintain a sub-region write count table and update content of the sub-region write count table in response to a write command issued by the host device, the sub-region write count table comprises a plurality of fields, each field is configured to record the write count that is associated with one sub-region and the content of the sub-region write count table is updated by increasing the write count(s) associated with the sub-region(s) that logical addresses designated in the write command belong to.

3. The data storage device as claimed in claim 1, wherein the memory controller is further configured to maintain a logic write count table and update content of the logic write count table in response to a write command issued by the host device, the logic write count table comprises a plurality of fields, each field is configured to record a write count that is associated with a logical address, and the memory controller updates the content of the logic write count table by increasing the write count(s) associated with one or more logical addresses designated in the write command, and maintains the write count for each sub-region according to the content of the logic write count table.

4. The data storage device as claimed in claim 1, wherein the memory controller determines whether the selected sub-region is the hot-write sub-region by determining whether the write count associated with the selected sub-region is greater than a threshold.

5. The data storage device as claimed in claim 1, wherein the memory controller is further configured to sort a plurality of write counts associated with the sub-regions and determine whether the selected sub-region is the hot-write sub-region according to the sorted write counts.

6. The data storage device as claimed in claim 1, wherein the memory controller is further configured to sort the activated counts recorded in the activated count table and select the one or more sub-regions to perform the data rearrangement procedure according to sorted activated counts.

7. The data storage device as claimed in claim 1, wherein the command issued by the host device is a Host Performance Booster (HPB) READ BUFFER command.

8. A data processing method for a data storage device comprising a memory device and a memory controller, wherein the memory device comprises a plurality of memory blocks, the memory blocks correspond to a plurality of logical units, each logical unit corresponds to a plurality of logical addresses, the logical addresses corresponding to each logical unit are divided into a plurality of regions and each region is further divided into a plurality of sub-regions, the memory controller is coupled to the memory device and configured to access the memory device, and the data processing method is performed by the memory controller and comprises:

establishing an activated count table and updating content of the activated count table in response to a command issued by a host device, wherein the activated count table comprises a plurality of fields and each field is configured to record an activated count that is associated with one sub-region, one or more sub-regions to be activated are identified in the command, and wherein the content of the activated count table is updated by increasing one or more activated counts associated with the one or more sub-regions identified in the command;

maintaining a write count for each sub-region;

selecting one or more sub-regions as one or more selected sub-regions to perform a data rearrangement procedure according to the content of the activated count table; and determining whether to exclude a sub-region from the one or more selected sub-regions according to the write count associated with the sub-region, wherein when the sub-region is determined as a hot-write sub-region according to the write count associated with the sub-region, the sub-region is excluded from the one or more selected sub-regions.

9. The data processing method as claimed in claim 8, wherein when the sub-region is determined as not the hot-write sub-region according to the write count associated with the sub-region, the sub-region is not excluded from the one or more selected sub-regions, and the data processing method further comprises:

performing the data rearrangement procedure on the one or more selected sub-regions to move data corresponding to logical addresses belonging to the one or more selected sub-regions to a memory space of the memory device having continuous physical addresses.

10. The data processing method as claimed in claim 8, further comprising:

establishing a sub-region write count table and updating content of the sub-region write count table in response to a write command issued by the host device, wherein the sub-region write count table comprises a plurality of fields, each field is configured to record the write count that is associated with one sub-region and the content of the sub-region write count table is updated by increasing the write count(s) associated with the sub-region(s) that logical addresses designated in the write command belong to.

11. The data processing method as claimed in claim 8, further comprising:

establishing a logic write count table and updating content of the logic write count table in response to a write command issued by the host device, wherein the logic write count table comprises a plurality of fields, each field is configured to record a write count that is associated with a logical address, the content of the logic write count table is updated by increasing the write count(s) associated with one or more logical addresses designated in the write command, and the write count for each sub-region is maintained according to the content of the logic write count table.

12. The data processing method as claimed in claim 8, wherein when the write count associated with the sub-region is greater than a threshold, the sub-region is determined as the hot-write sub-region.

13. The data processing method as claimed in claim 8, further comprising:

sorting a plurality of write counts associated with the sub-regions, and wherein step of determining whether to exclude a sub-region from one or more selected sub-regions according to the write count associated with the sub-region further comprises:

determining whether the sub-region is the hot-write sub-region according to the sorted write counts.

14. The data processing method as claimed in claim 8, wherein step of selecting the one or more sub-regions as the one or more selected sub-regions to perform the data rearrangement procedure according to the content of the activated count table further comprises:

sorting the activated counts recorded in the activated count table; and selecting the one or more sub-regions to perform the data rearrangement procedure according to sorted activated counts.

15. The data processing method as claimed in claim 8, wherein the command issued by the host device is a Host Performance Booster (HPB) READ BUFFER command.

\*    \*    \*    \*    \*